United States Patent [19]

Carnegie, Jr.

[11] 3,964,850

[45] June 22, 1976

[54] THERMOPLASTIC SHEET PRESSURE FORMING MACHINE

[75] Inventor: Frank Carnegie, Jr., Montville, N.J.

[73] Assignee: Camid Intermatic, New York, N.Y.

[22] Filed: Nov. 27, 1974

[21] Appl. No.: 527,587

[52] U.S. Cl. ............................... 425/292; 425/156; 264/92; 264/160
[51] Int. Cl.² ........................ B29C 3/06; B29C 5/06
[58] Field of Search ........ 425/184, 292, 235, 451.6, 425/388, 156; 264/92, 151, 160

[56] References Cited
UNITED STATES PATENTS

| | | | |
|---|---|---|---|
| 3,113,345 | 12/1963 | Butzko | 425/292 |
| 3,166,790 | 1/1965 | Keges | 425/388 X |
| 3,518,334 | 6/1970 | Carrigan et al. | 425/292 X |
| 3,736,092 | 5/1973 | Konig et al. | 425/451.6 |
| 3,755,522 | 8/1973 | Jope et al. | 425/292 X |

*Primary Examiner*—Francis S. Husar
*Assistant Examiner*—Robert J. Charvat
*Attorney, Agent, or Firm*—Eliot S. Gerber

[57] ABSTRACT

An apparatus for forming and cutting thermoplastic sheets comprises a heater platen and base plate assembly with a toggle leverage assembly which brings the base plate assembly into and out of a closed relation with the heater platen with a sheet of thermoplastic material therebetween. The base plate assembly has a strip of elastic material mounted thereon, one or more mold (forming) sections, cutting blades defining the peripheral outline of the mold sections and a seal-off plate slidably mounted on the base plate assembly and resting on the elastic strips.

9 Claims, 12 Drawing Figures

THERMOPLASTIC SHEET PRESSURE FORMING MACHINE

BACKGROUND OF THE INVENTION

The present invention relates to an apparatus for forming and cutting thermoplastic sheets into formed sections.

The apparatus of the present invention is designed for use in the production of thermoplastic sheet products of various shapes and sizes. In recent years these thermoplastic products have found important applications, primarily in the packaging industry. The thermoplastic sheet is formed into the general shape of the product to be packaged, or into cup shape, and has a flange which is adhered to a cardboard backing. The type of package is sometimes called a "blister pack". The transparent quality of the thermoplastic material permits a display of the packaged product and increases its marketability and the package is convenient to handle and sell.

In the past machines have been proposed to form thermoplastic sheets into various shapes. In these machines the thermoplastic sheets are clamped between a heating platen, which softens the sheet, and a forming mold and a blade severs the formed sheet portion from its surrounding sheet. In one such machine a cutting blade is employed to partially penetrate the thermoplastic sheet to form a seal for a vacuum or for air pressure while the forming process is in progress. The vacuum or pressure forces the heat-softened sheet portion into the mold. At the conclusion of the forming process, the cutting blade is permitted to fully penetrate the thermoplastic sheet to sever the formed portion. In that machine there is a problem in cutting or in the sealing because the thermoplastic sheet is thin and a partial penetration of that thin sheet by the blade necessitates a high precision operation.

OBJECTIVES OF THE INVENTION

It is therefore an objective of the present invention to provide a new and improved apparatus to form and cut thermoplastic sheets in blisters for use in packaging.

A further objective of the present invention is to provide a new and improved apparatus to clamp the thermoplastic sheet and sever the formed portion.

A still further objective of the present invention is to provide a new and improved thermoplastic forming apparatus that is of simple construction and operation.

DETAILED DESCRIPTION OF THE DRAWINGS

The foregoing and other objects, features and advantages of the present invention will be more readily apparent from the following more detailed description taken in conjunction with the accompanying drawings, in which.

Figure 1:
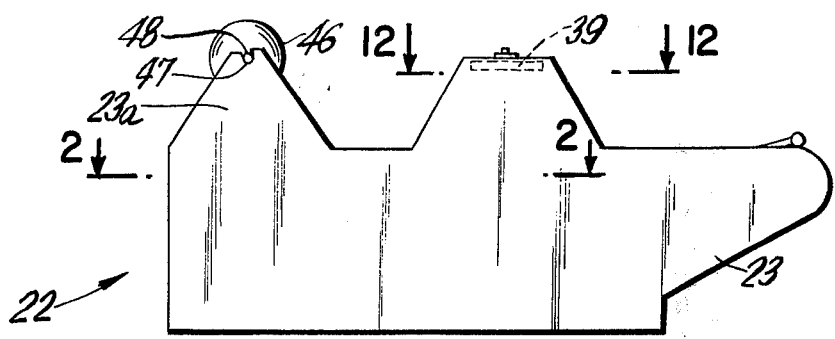
FIG. 1 is a side view of the apparatus according to the invention.
Figure 2:
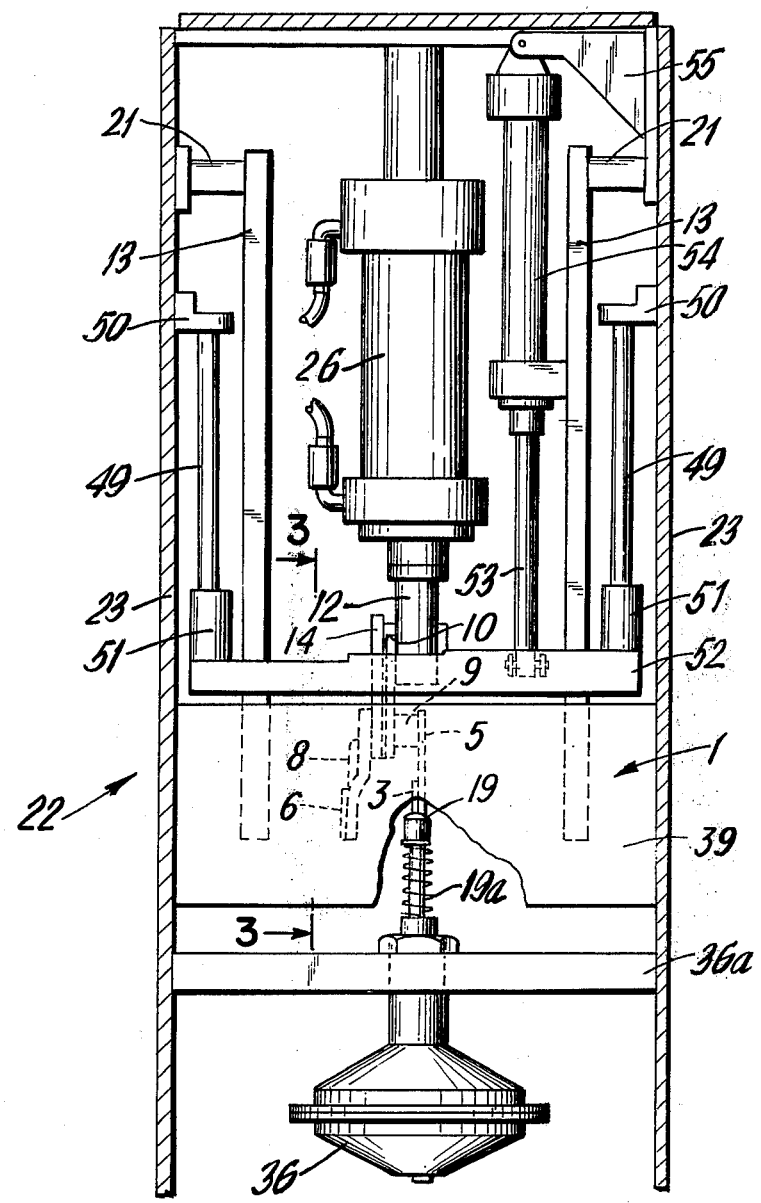
FIG. 2 is a top sectional view of the apparatus of FIG. 1.
Figure 4:
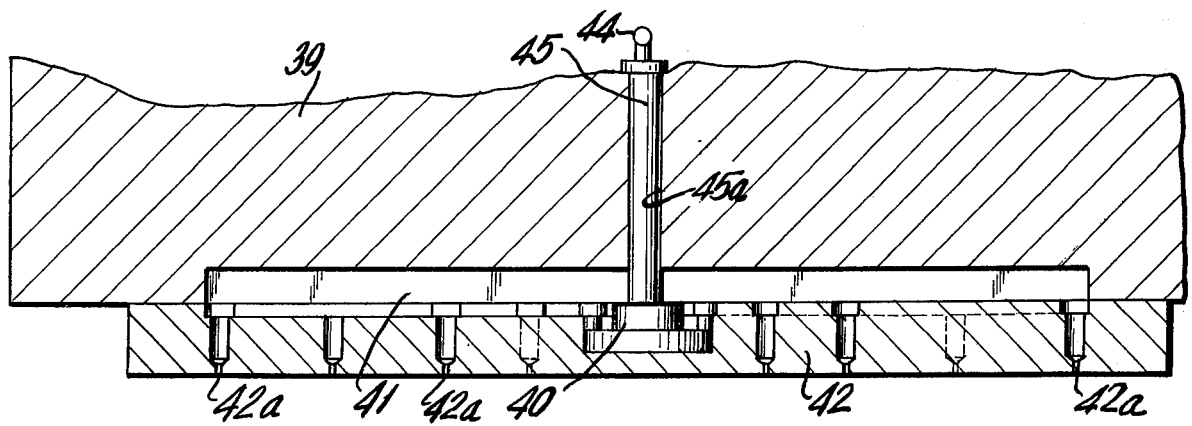
FIG. 4 is a cross-sectional view of the heater platen.

Referring to the drawings at FIGS. 1 and 2, the apparatus for forming thermoplastic sheet material, according to the illustrated exemplary embodiment of the invention, includes a base 22 having fixed thereto two upward extensions constituting side walls 23. A heater platen 39 is secured between the side walls 23 by means of bolts. As shown in FIG. 4, a plate 42 provided with a plurality of pressure (stress) air outlets 42a is attached to the bottom surface of the heater platen 39 by means of a fastening device 40 (pressure pipe). The outlets 42a are in air flow communication with a manifold 41 in the plate 42 and the manifold 41 is in air flow communication with a pressure pipe 45 through hole 45a.

The pipe 45 passes through the heater platen 39 and leads to air port 44, the air port 44 being connected to a source of air pressure such as an air compression pump. The source of air pressure preferably uses heated air. A heated air chamber is used so that the air used in the forming cycle is preheated. This provides a more even distribution of the film sheet in the mold cavity. Furthermore, the use of heated air permits the use of thinner films to obtain stronger parts. The heater platen 39 is heated by electrical resistance coils suitably distributed throughout its body member and connected to a source of electrical current. The heat is kept at a predetermined temperature by a thermistor regulator (not shown).

The embodiment of the present invention illustrated in the accompanying drawings utilizes a heated platen as described above. Alternatively, and not shown, the platen need not be heated. In that alternative the plastic sheet is heated and softened by a preheater, for example, an oven construction or heated rollers, which is located between the roll of plastic sheet material and the mold. Further, the platen may be replaced by other means to temporarily secure the sheet material on the mold, for example, chains which are positioned on top of the sheet material.

The plate 42 is shown as being applied to one particular shape and size of blister packaging. Generally a separate plate 42 will be specifically designed for each blister packaging size and shape. The custom designing of each plate 42 enables the placement of the pressure (stress) air outlets 42a to be located for the most efficient operation. For example, it is often preferred that the pressure air outlets 42a are located on the flanges rather than in the center. The air pressure will act on the flange of the plastic blister and there will be a decreased likelihood of marking the face plastic of the blister. The size of each plate 42 is formed to match each of the molds utilized in the machine. This permits different widths of the sheets of plastic resin to be utilized. Preferably the plate 42 is made smaller than the width of the sheet of plastic resin so that a cold frame is maintained about the part.

As shown in FIG. 2, pivot arms 21, pivotally mounted to side walls 23 of the base 22, pivotally support forwardly extending arms 13.

Figure 3:
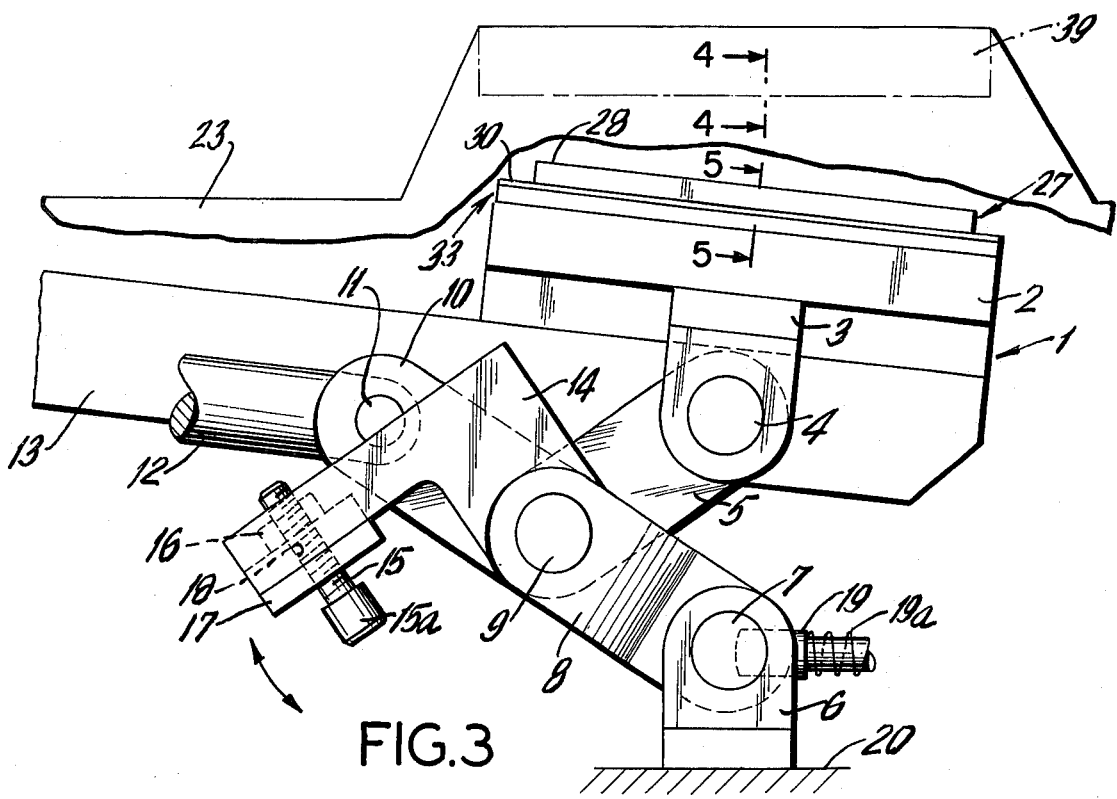
FIG. 3 is a side elevation of the toggle leverage in its lowered position.

As shown in FIG. 3, a forming platen 1 is supported between extending arms 13. The forming platen 1 is positioned to be moved and placed in an aligning position directly below the heater platen 39. The upper portion of the platen 1 is provided with two side extensions 2. A bracket 3 is mounted on the under surface of each side extension 2. The brackets 3 are pivotally connected to links 5 by means of pivot pins 4. The other end of the links 5 are pivotally connected to links 8 by pivot pins 9. The links 8 are pivotally connected at their opposite ends to fixed brackets 6 by means of pivot pins 7. The brackets 6 are mounted on crossbeam 20 which is mounted to the side walls of the base 22.

Integral extension portions 10 of links 8 extend rearwardly and are pivotally connected to piston rod 12 by means of elongated pivot rod 11. As can be seen in FIG. 2, this piston rod 12 is the output piston of air cylinder 26 which is firmly braced and fixed to the rear wall of the base 22. The air cylinder 26 is connected to a source of air pressure and can impart movement to piston rod 12.

This machine provides a toggle leverage to raise and lower platen 1 and is shown, in the lowered position, in FIG. 3. The toggle leverage is prevented from initially fully closing (its first partly open position) by the action of stop member 19 which limits the counterclockwise (as seen in FIG. 3) travel of screw head 15, the screw head 15 being adjustably fixed in cross-bar member 17.

As seen in FIG. 3, the screw 15, carrying screw head 15a, is secured to cross-bar member 17 through its hole 18 by nut 16. The cross-bar member 17 is firmly secured at each end, as by welding, to L-shaped members 14, which L-shaped members 14 are pivotally connected to the toggle leverage by pivot pins 9.

Figures 10, 11:
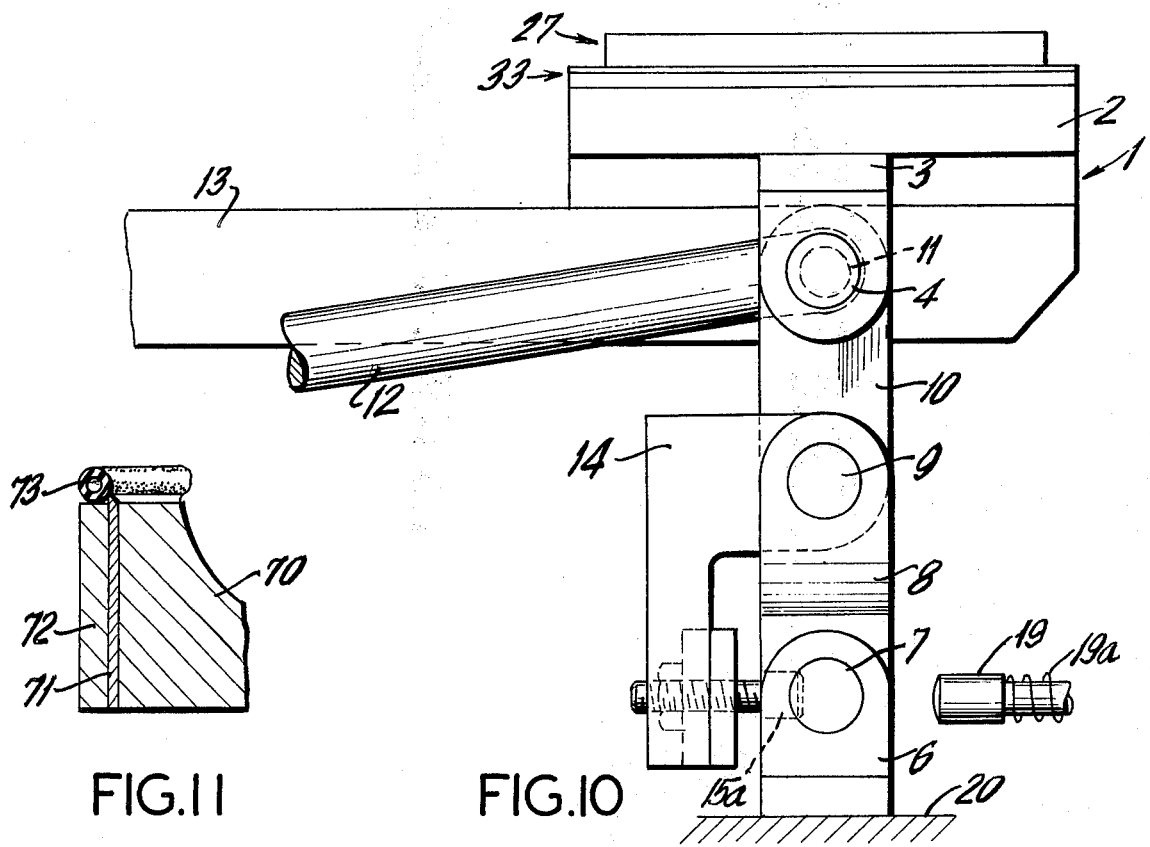
FIG. 10 shows the toggle leverage in the second fully closed position.
FIG. 11 is a detailed sectional view on an enlarged scale showing an alternative embodiment useable in the present invention.
Figure 12:
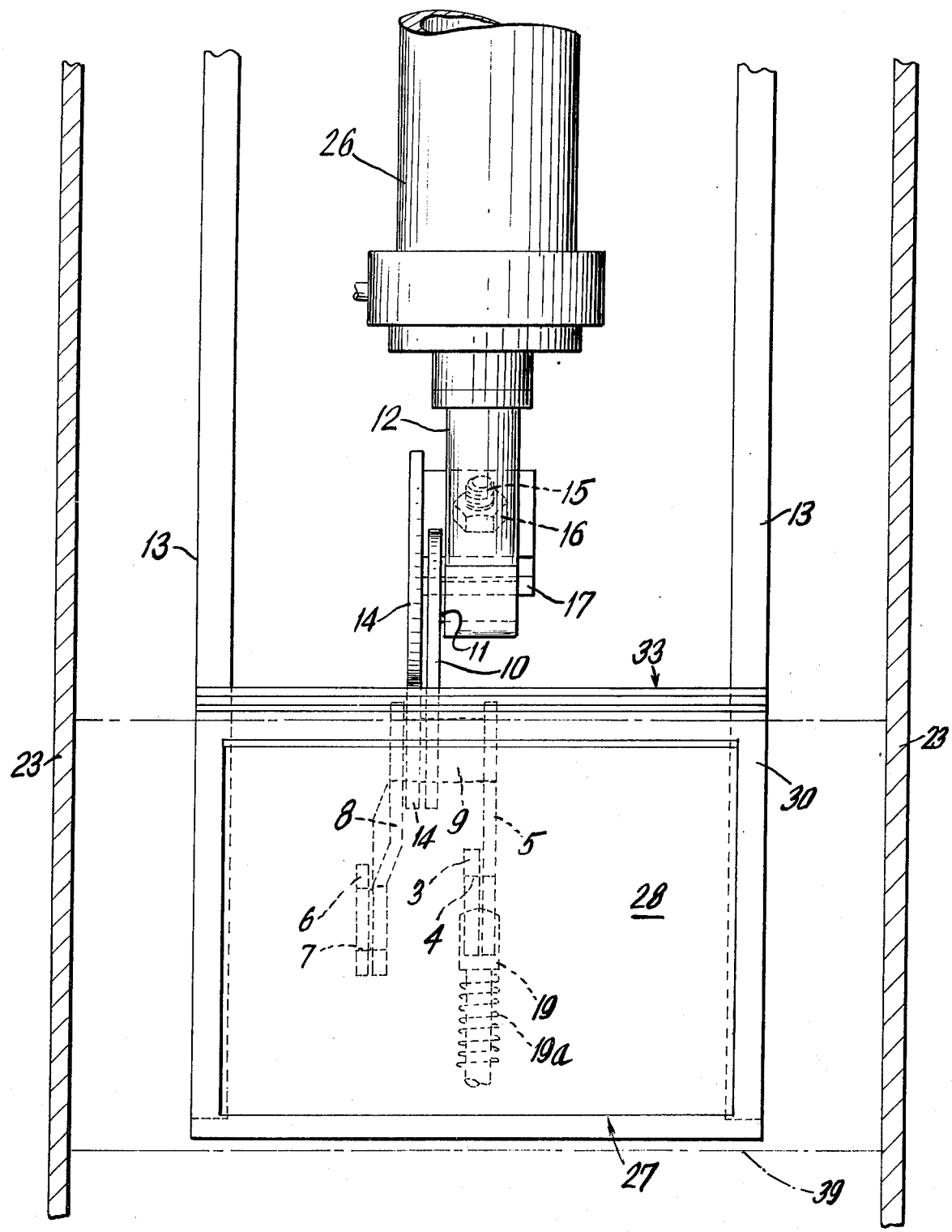
FIG. 12 is a top plan view of the apparatus of FIG. 1.

As can be seen in FIG. 2, the stop member 19 is fixed to a diaphragm valve 36 which is secured to the side walls 23 of the base 22 by cross-beam 36a. The neck of the stop member 19 is provided with a coil spring 19a. Normally the stop member 19 is in an extended position. The action of the diaphragm valve 36 retracts the stop member 19 against the force of the spring. The spring serves to restore the stop memeber 19 to its normal extended position upon its release by the actuation of the diaphragm valve 36. When the stop member 19 is in its retracted position, the toggle leverage can be fully closed ("second position"), as shown in FIG. 10, because the screw-head 15a may be further rotated counterclockwise (as seen in FIG. 3). Such further counterclockwise movement of screw head 15a, and the further counterclockwise movement of its L-shaped member 14, permits the centers of pivot pins 9 to move to the right (as seen in FIG. 3). The rightward movement of pivot pins 9 causes the links 5 to move counterclockwise and links 8 to move clockwise until they are vertically aligned to each other at the full closure position ("second position").

As shown in FIG. 3, a base plate assembly 27 is mounted to the top of the platen 1. The action of the toggle leverage serves to bring the base plate assembly 27 into and out of a closed relation with the heater platen 39 when a sheet of thermoplastic material is positioned between them.

Figure 5:
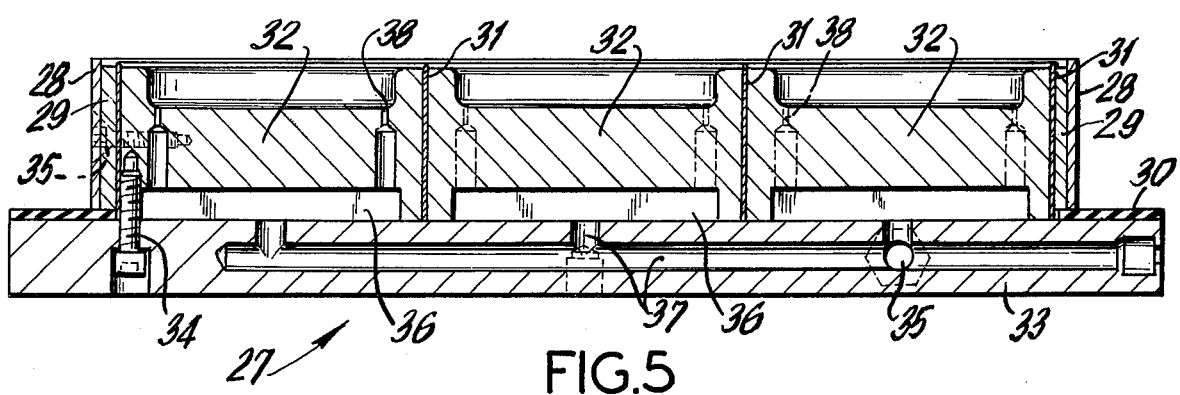
FIG. 5 is a cross-sectional view of the base plate assembly.
Figure 6:
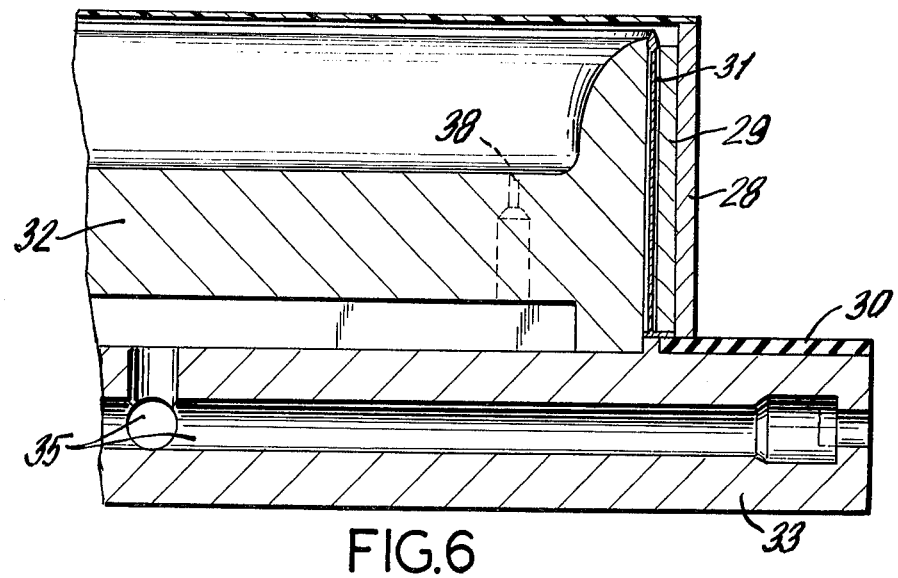
FIG. 6 is a detailed sectional view on an enlarged scale showing the first step of the forming process.

The base plate assembly 27 is shown in FIG. 5 and is provided with a mold plate 33 upon which is placed strips of elastic material 30 such as rubber sheet material of one-fourth inch in thickness. Mold plate 33 has three forming sections 32 which are cavity indentations in the shape of the article to be formed, which sections 32 are secured to the mold plate 33 by means of bolts 34. The forming sections 32 are further provided with suitably disposed stress air (air pressure) outlets 38 which are in air flow communication with a manifold 36 located within each forming section 32. Each manifold 36 is in air-flow communication through a connection pipe 37 and air port 35, in the mold plate 33, to a source of air pressure, for example, an air compression pump.

As shown in FIG. 5, cutting blades 31 are vertically disposed around the periphery of each of the forming sections 32 and are given lateral support by a chase 29 secured by means of screws 35 into the sides of the forming sections 32. As will be presented more clearly below, these cutting blades 31 are adapted to sever the formed thermoplastic article, i.e., the formed portion of the thermoplastic sheet, form the surrounding sheet.

A seal-off plate 28 is slidably mounted around the chase 29 and rests on the elastic material 30. Preferably the seal-off plate 28 is a metal endless belt which slides vertically on the chase 29. The top portion of seal-off plate protrudes above the chase 29 and cutting blades 31 and serves as a seal between the base plate assembly 27 and thermoplastic sheet when the base plate assembly 27 is in a closed relation with the heater platen 39.

As shown in FIG. 1, at the rear end of the base 22 are two upward extension portions 23a of the side walls 23. A roll of thermoplastic sheet material 46 is rotatably mounted on the top portion of extension portions 23a by means of a spindle 47 rotatably and removably secured in notches 48.

As shown in FIG. 2, two rod-shaped tracks 49 are mounted by means of brackets 50 to the side walls 23 of the base 22. These tracks run parallel to one another in the horizontal plane in the space between the thermoplastic roll mounting and the heater platen 39. Sliders 51 are slidably mounted on the tracks 49 with each of the two tracks 49 supporting one slider 51. A transverse bar 52 is provided with a longitudinal slit through which the thermoplastic material from the roll 46 is passed. An air cylinder 54 is mounted to the side wall of the base 22 by means of its being fixed to bracket 55, which bracket 55 is fixed to a side wall 23. The outer end of piston rod 53 of air cylinder 54 is mounted to the underside of the transverse rod 52 by a bracket.

The above-described mechanism serves as a transport for the thermoplastic material. There is sufficient friction between the thermoplastic material and the inner walls of the longitudinal slit of the transverse bar 52 so that when the transverse bar 52 is moved forward, upon actuation of the piston rod 53, the thermoplastic material will be advanced. When the transverse bar 52 is returned to its start position, the thermoplastic material will be firmly held by the heater platen 39 and base plate assembly 27 (when they are in the closed position) and the transverse bar 52 will therefore slip along the thermoplastic material and not pull it backwards.

Figure 7:
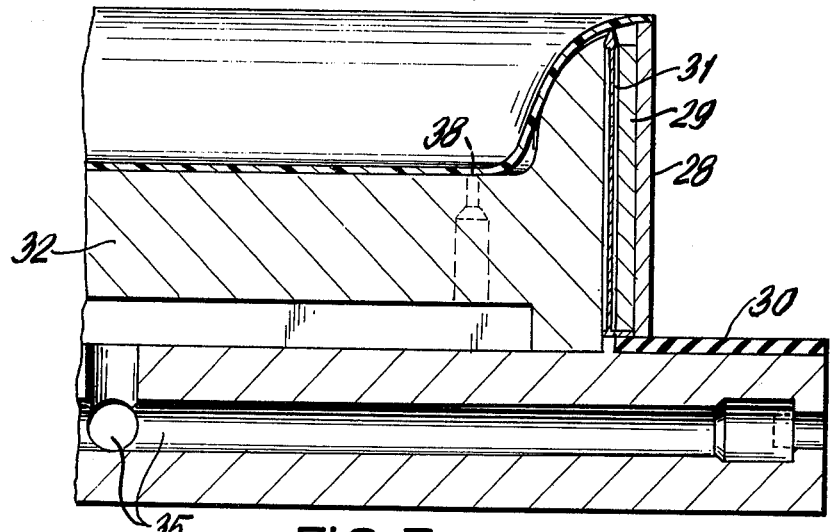
FIG. 7 is a similar view showing the thermoplastic sheet in the forming mold.
Figure 8:
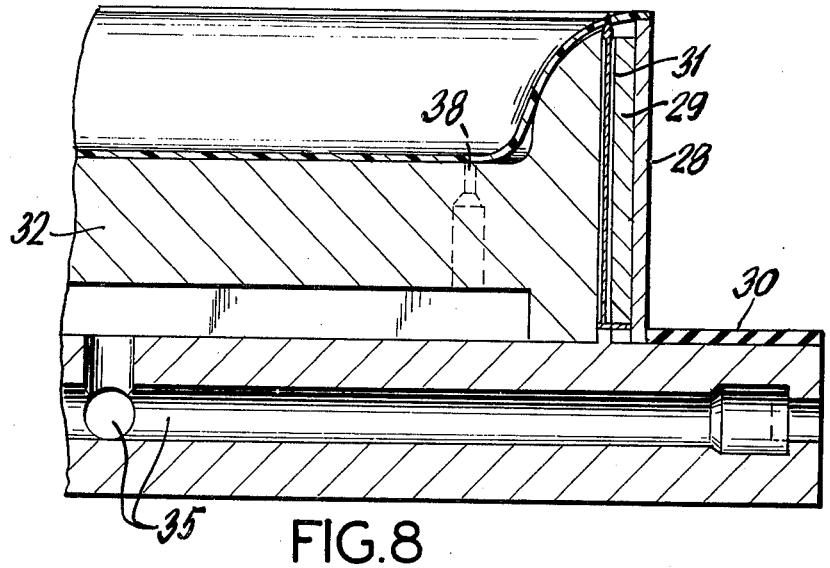
FIG. 8 is a similar view showing the severing coaction of the seal-off plate and cutting blade.
Figure 9:
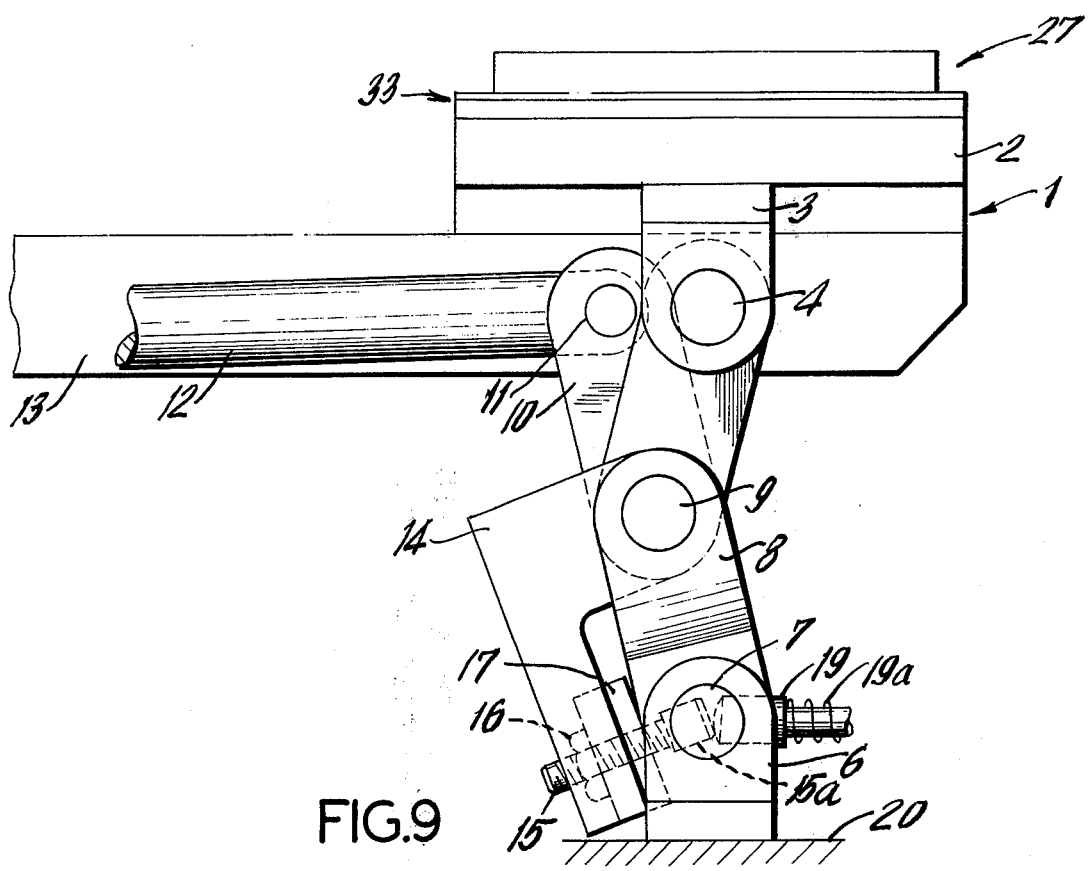
FIG. 9 shows the toggle leverage in the first position.

In the operation of the apparatus, the thermoplastic sheet is advanced from the roll 46 by the above-described mechanism to a position between the heater platen 39 and the base plate assembly 27. As shown in FIG. 9, the toggle leverage is closed to its "first position" by the piston rod 12. In the "first position" the thermoplastic sheet material is securely held between the base plate assembly 27 and the heater platen 39 by means of the seal-off plate 28. Air pressure is then applied through air outlets 38 to force the thermoplastic sheet up against the heater platen 39. A suitable electronic timer (not shown), which controls air pressure valves, is employed to start and stop the air pressure through outlets 38. After the air pressure through outlets 38 is stopped, then air pressure through the air outlets 42 is started, to force the heated thermoplastic material into the forming sections 32, see FIG. 7. The timing mechanism then stops the air pressure through outlets 42 and the electronic timer then releases the diaphragm valve 36 to retract stop member 19. The retraction of stop member 19, permitting piston rod 12 to further extend outward and fully close the toggle leverage, is shown in FIG. 10. The additional force exerted by the toggle leverage causes the seal-off plate 28 to be pushed downwardly into the elastic material 30, thereby exposing the cutting edges of the cutting blades 31 which sever the formed article (the formed portion of the sheet) from the surrounding sheet, see FIG. 8.

An alternative embodiment of the mold assembly is shown in FIG. 11. In that embodiment each mold section 70 having air pressure outlets (not shown) is surrounded and bordered by a fixed vertical cutting knife 71. Each knife 71 is bordered and surrounded by a fixed seal plate 72. Neither the knife 72 or the seal plate 72 moves. However, an elongated rubber tube 73 is fixed on top of the seal plate 72. The tube 73 is normally round and expanded and in that state will seal against the thermoplastic sheet in the partly closed position of the heater platen and mold assembly. Upon further complete closing, the tube 73 is compressed to below the level of the blade edge of the knife 71, and that blade edge cuts the desired portion of the thermoplastic sheet.

Modifications may be made in the above-described preferred embodiment of the present invention within the scope of the sub-joined claims. For example, the embodiment described above uses air pressure to hold the thermoplastic sheet against the heater platen and to, in effect, blow the thereby heated and softened (more flexible and pliable) sheet into the forming molds. Alternatively, vacuum may be used to pull the thermoplastic sheet up to and against the heater platen or vacuum may be used to pull the heated and softened thermoplastic sheet into the forming mold, or vacuum may be used for both of those functions.

As another example, the rubber elastic strip (elastic and resilient member) which is beneath the seal-off plate may be replaced by a set of compression springs or may move in an air-tight manner into a channel having a controlled and timed air pressure which lifts it and permits its downward movement.

In another modification of the present invention the platen is not heated and the plastic resin film is heated, and thereby softened, before it reaches the platen. A suitable "preheater" which heats the film before it enters the platen is an oven having electric ceramic heating units above the film. Two pin chains, one on either edge of the plastic film, has a series of pins which penetrate the film. The chains are progressed along and drag the film through the oven, then below the platen mold, and then beyond the mold area where the formed part is air-blown into a stacker or collection box.

I claim:

1. A forming apparatus for molding thermoplastic sheet material comprising:
   a. a base,
   b. a platen and mold plate assembly on said base, said platen and mold plate assembly being openable and closeable relative to each other,
   c. said mold plate assembly being provided with at least one forming mold section, a flexible member of elastic material attached as part of said mold plate assembly and forming at least a partial border around the lower portion of said forming mold section, a seal-off plate slidably mounted on said mold plate assembly and defining a peripheral outline and projecting upwards from said forming section and resting on said elastic material,
   d. transport means mounted on said base for bringing said mold plate assembly into and out of said closed relationship with said platen when a sheet of thermoplastic sheet material is positioned therebetween and held in a sealed relation with said base plate assembly by said seal-off plate.
   e. cutting means carried by said mold plate assembly and defining a peripheral outline of the portion of the thermoplastic sheet to be cut, said cutting means being recessed below said seal-off plate except when said seal-off plate is pushed into said flexible member;
   f. limiting means associated with said platen and mold plate assembly for limiting said closed relationship between platen and mold plate assembly to a point where the seal-off plate holds the thermoplastic sheet in a sealed relation to said mold plate assembly without said seal-off plate being depressed into said elastic material,
   g. pressure means associated with said platen and mold plate assembly for applying pressure to said thermoplastic sheet, first to hold the sheet against the platen, then to move the thermoplastic sheet into said forming section, and
   h. retracting means connected to said limiting means for retracting said limiting means permitting a full closure of said closed relation thereby depressing said seal-off plate into said elastic material and thereby exposing the cutting means to cut the formed article from said thermoplastic sheet.

2. A forming apparatus as in claim 1 wherein said mold plate assembly has a plurality of forming mold sections, each of said forming mold sections has a cutting means forming a border therearound, and a single seal-off plate surrounds said plurality of forming mold sections.

3. A forming apparatus as in claim 1 wherein said seal-off plate is mounted for vertical slidable movement on said forming mold section.

4. A forming apparatus as in claim 1 wherein said transport means includes an air cylinder having an output piston, a toggle linkage pivotally fixed to said piston and pivotally fixed to said mold plate assembly.

5. A forming apparatus as in claim 1 wherein said retracting means includes an air device having an output piston, a stop member fixed to said piston, and a spring which spring loads said piston.

6. A forming apparatus as in claim 1 wherein said means for applying pressure includes an air pressure supply connection hose and a series of manifolds and tubes and outlets and pressure control valves to selectively and in times sequence apply pressure to said sheet.

7. A forming apparatus as in claim 6 wherein both said platen and said mold plate assembly contain said manifold, tube and outlets.

8. A forming apparatus for molding thermoplastic sheet material comprising:
   a. a base,
   b. a platen and a mold plate assembly on said base, said platen and mold plate assembly being openable and closeable relative to each other,
   c. said mold plate assembly on said base and provided with at least one forming mold section, a seal-off plate mounted on said mold plate assembly and defining a peripheral outline and projecting upwards from said forming section, a flexible member of elastic material attached at the top of said seal-off plate,
   d. transport means mounted on said base for bringing said mold plate assembly into and out of said closed relationship with said platen when a sheet of thermoplastic sheet material is positioned therebetween and held in a sealed relation with said base plate assembly by said seal-off plate,
   e. cutting means carried by said mold plate assembly and defining a peripheral outline of the portion of the thermoplastic sheet to be cut, said cutting means being recessed below said flexible member except when cutting;
   f. limit means associated with said platen and mold plate assembly for limiting said closed relationship between platen and mold plate assembly to a point where the seal-off plate holds the thermoplastic sheet in a sealed relation to said mold plate assembly without entire compression of said flexible member;
   g. means associated with said platen and said mold assembly for applying pressure to said thermoplastic sheet, first to hold the sheet against the platen, then to move the thermoplastic sheet into said forming section,
   h. retracting means connected to said limiting means for retracting said limiting means permitting a full closure of said closed relationship thereby depressing said flexible member and thereby exposing the cutting means to cut the formed article from said thermoplastic sheet.

9. A forming apparatus as in claim 8 wherein said flexible member is an elongated tube.

* * * * *

UNITED STATES PATENT OFFICE
CERTIFICATE OF CORRECTION

Patent No. 3,964,850          Dated June 22, 1976

Inventor(s) Frank Carnegie, Jr.

It is certified that error appears in the above-identified patent and that said Letters Patent are hereby corrected as shown below:

Column 3, line 46 - "memeber" changed to -- member --;

Column 4, line 21 - "form" changed to -- from --;

Column 6, line 18 - "therm-" changed to -- thermo- --;

Column 6, line 67 - "times" changed to -- timed --

Signed and Sealed this

Thirty-first Day of August 1976

[SEAL]

Attest:

RUTH C. MASON
*Attesting Officer*

C. MARSHALL DANN
*Commissioner of Patents and Trademarks*